(12) United States Patent
Moritz et al.

(10) Patent No.: US 6,960,992 B2
(45) Date of Patent: Nov. 1, 2005

(54) VEHICLE INTRUSION DETECTOR FOR DETECTING THE SEVERITY OF AN ACCIDENT

(75) Inventors: Rainer Moritz, Filderstadt (DE); Frank-Juergen Stuetzler, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 81 days.

(21) Appl. No.: 10/276,113

(22) PCT Filed: Mar. 28, 2001

(86) PCT No.: PCT/DE01/01182

§ 371 (c)(1),
(2), (4) Date: Nov. 12, 2002

(87) PCT Pub. No.: WO01/87673

PCT Pub. Date: Nov. 22, 2001

(65) Prior Publication Data

US 2003/0164755 A1 Sep. 4, 2003

(30) Foreign Application Priority Data

May 13, 2000 (DE) .......................................... 100 23 588

(51) Int. Cl.[7] .......................... G60Q 1/00; G08B 13/00; G08B 13/18; G01C 21/26; G06G 7/78
(52) U.S. Cl. ....................... 340/436; 340/666; 340/556; 340/557; 340/565; 340/435; 701/214; 701/300; 701/301
(58) Field of Search ............................... 340/435, 436, 340/555–557, 565; 701/214, 300, 301; 280/735; 385/12; 180/274

(56) References Cited

U.S. PATENT DOCUMENTS

| | | | | |
|---|---|---|---|---|
| 5,179,256 A | * | 1/1993 | Haglund | 200/52 R |
| 5,281,780 A | * | 1/1994 | Haland | 200/52 R |
| 5,315,673 A | * | 5/1994 | Stetter et al. | 385/12 |
| 5,419,407 A | * | 5/1995 | Meyer et al. | 180/274 |
| 6,144,790 A | * | 11/2000 | Bledin | 385/121 |
| 6,470,273 B2 | * | 10/2002 | Halsted et al. | 701/301 |
| 6,607,212 B1 | * | 8/2003 | Reimer et al. | 280/735 |

FOREIGN PATENT DOCUMENTS

| | | | |
|---|---|---|---|
| DE | 32 31 800 | 3/1984 | |
| DE | 3716168 A1 * | 11/1988 | .......... B60R/21/32 |
| DE | 44 33 046 | 3/1996 | |
| DE | 195 37 383 | 4/1997 | |
| WO | 95 34085 | 12/1995 | |

* cited by examiner

*Primary Examiner*—Jeffery Hofsass
*Assistant Examiner*—Lam Pham
(74) *Attorney, Agent, or Firm*—Kenyon & Kenyon

(57) ABSTRACT

An intrusion sensor which includes a first light guide arrangement and a second light guide arrangement for detecting the severity of an accident in a vehicle. An interval having a width is positioned between the two light guide arrangements. In this case, the first light guide arrangement is positioned in the direction of an intrusion side. The second light guide arrangement is positioned in the direction of the vehicle interior side.

21 Claims, 3 Drawing Sheets

VEHICLE INTRUSION DETECTOR FOR DETECTING THE SEVERITY OF AN ACCIDENT

FIELD OF THE INVENTION

The present invention relates to an intrusion sensor for detecting the severity of an accident in a vehicle.

BACKGROUND INFORMATION

Currently, restraint arrangements such as airbags are used to increase safety in a vehicle, an accident is recognized using acceleration sensors and a decision is made within a few milliseconds whether and which restraint arrangement are to be triggered. At the same time, differentiation is made between a side impact and a front impact. In both cases, restraint arrangement which partially differ are to be deployed in order to protect the vehicle occupants.

An acceleration sensor of this type is described in German Published Patent Application No. 32 31 800, for example. In this case, a spring-caged inertial mass, which is subjected to the acceleration to be measured, is deflected and the deflection is detected in relation to a spatially fixed reference point. In the event an acceleration threshold is exceeded, a deployment signal is generated. In this case, a massive body includes a first light guide, to whose end a light source is applied. The other end of the light guide, in the idle state and in the deflected state as a function of acceleration, is diametrically opposed to light guides which are connected to photoelements. If an acceleration occurs, the first light guide is moved so that the light from the light source which is guided through the first light guide is received by a different photocell than in the idle state. From this, the acceleration may be established and a restraint arrangement may correspondingly be triggered.

Currently, acceleration sensors are the sole information source for the recognition of a critical situation, on the basis of which the deployment algorithm calculates a deployment decision of the restraint arrangement. With an increasing number of stages in the triggering of the restraint arrangement (e.g., two-stage airbags), the different severities of accidents are differentiated more precisely from one another, in order to trigger the various restraint arrangements and their various stages optimally for the protection of the occupants.

In the event of a side impact, a restraint arrangement is to be triggered in the first milliseconds after the initial contact in order to deploy a protective action for the occupants in a timely manner. However, the typical acceleration sensors only fulfill these requirements unsatisfactorily. The acceleration sensors are also, for example, overtaxed in the event of a frontal impact on the rear side of the vehicle. In the event of a side impact, until now, the conventional systems only differentiated very roughly between an impact in the front or rear. Differentiations such as the penetration of an obstacle into a door or an impact of an object onto the A, B, and/or C pillars of the vehicle are not possible using the current acceleration sensor technology.

SUMMARY OF THE INVENTION

The intrusion sensor according to the present invention for detecting the severity of an accident in a vehicle may provide the advantage that a very precise and rapid measurement of the intrusion speed, i.e., the speed at which an object impacts the vehicle or the vehicle impacts an object, is possible. Also, through the positioning of a first and second light guide arrangement, which have an interval between them having a selected width, it is possible to ensure significantly faster deployment times. In order to allow precise determination of the beginning of the accident and of the intrusion speed, the first light guide arrangement is positioned directed toward an intrusion side (i.e., a side from which an impact is expected) and the second light guide arrangement is positioned directed toward a vehicle interior. In other words, the two light guide arrangements are positioned next to one another along an outer contour of a vehicle. Since light is used as a measurement medium, the measurement itself is not susceptible to EMC influences.

The first light guide arrangement includes multiple light guide loops, each of which has a different length. In this manner, the location of the impact is precisely determined, since, as a function of the impact location, only some of the light guide loops will be bent and/or damaged due to the differing lengths of the light guide loops. A very precise determination of the impact location on the vehicle may be made possible at the same time as a function of the different lengths and/or the number of the light guide loops. In this case, the light guide loops may be positioned next to one another horizontally or vertically.

The lengths of the light guide loops in the longitudinal direction differ by an identical amount. This may allow a selected classification of the intrusion sensor into multiple segments having an identical segment length. In this manner, a local resolution of the impact in the longitudinal axis of the sensor having a minimum resolution of one segment length is achieved.

In an example embodiment, the interval between the two light guide arrangements is filled with foam. This results in a low weight of the intrusion sensor according to the present invention.

In order to have the smallest possible number of components, the first and the second light guide arrangements have a shared light-emitting element. The first and second light guide arrangements may also have a shared light-absorbing element. In this manner, an especially cost-effective intrusion sensor including a low number of components may be produced.

The light-emitting element and the light-absorbing element are directly optically coupled through the use of the first and second light guide arrangements and self-calibration of the intrusion sensor is made possible. For example, the self-calibration may be performed in that every time the vehicle is started the quantity of light absorbed by the light-absorbing element as the initial quantity of light is used as a new reference value for the intrusion sensor. Due to this, the intrusion sensor according to the present invention is not susceptible to aging effects of the light guide arrangements.

In order to provide an intrusion sensor having a high sensitivity even in the event of a slight impact, the light guides of the light guide arrangement are coated. In this manner, rapid waving is achieved on the light guide in the event of an impact. For this purpose, a plastic coating may be used, for example, which includes a serrated profile on its interior, i.e., toward the light guide. It is also possible for a light guide made of glass fibers to be wrapped using an additional glass fiber having a smaller diameter. If a glass fiber wrapped in this manner is pressed between hard objects, the pressure on the coating produces a meandering of the light-guiding glass fibers lying in between and light is scattered into the surroundings.

In order to provide a cost-effective intrusion sensor, the light-emitting element is an LED and the light-absorbing element is a photodiode.

The intrusion sensor according to the present invention is positioned in the door region of a motor vehicle and/or in the bumpers. However, it is also possible to position the intrusion sensor according to the present invention at other locations of the motor vehicle, in the roof region or on the fenders, for example.

An example embodiment of the present invention is illustrated in the drawings and described in the following description.

DETAILED DESCRIPTION

An example embodiment of an intrusion sensor according to the present invention is illustrated in FIGS. 1 to 6.

Figure 1:
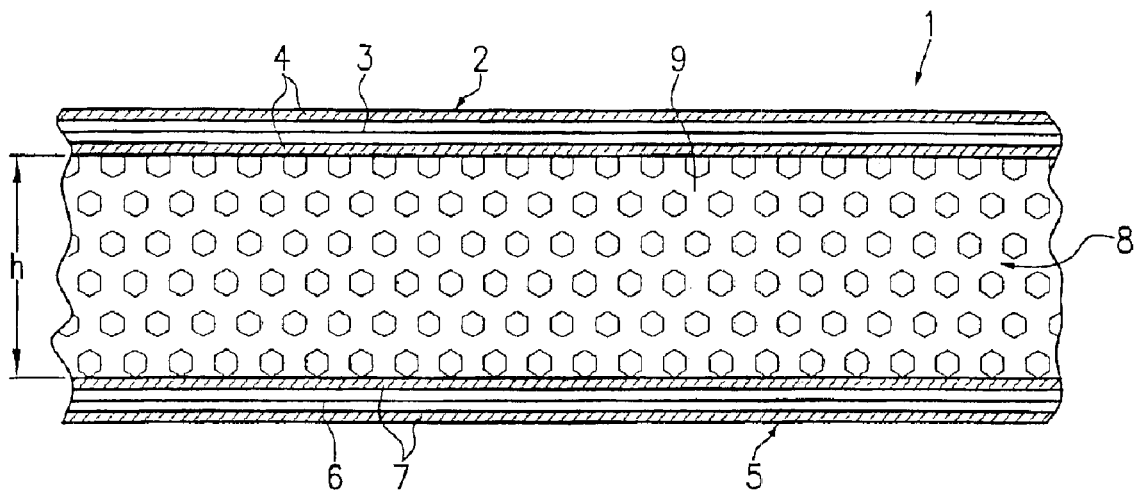
FIG. 1 shows a sectional view of an intrusion sensor according to an example embodiment of the present invention.

FIG. 1 shows a simplified schematic sectional view of an intrusion sensor 1. Intrusion sensor 1 includes a first light guide arrangement 2 and a second light guide arrangement 5. First light guide arrangement 2 includes a glass fiber cable 3, which includes a coating 4 made of a hard plastic. Furthermore, first light guide arrangement 2 includes a light-emitting element and a light-absorbing element (neither shown). Second light guide arrangement 5 includes a glass fiber cable 6, which includes a coating 7 made of a hard plastic. Furthermore, second light guide arrangement 5 also includes a light-emitting element and a light-absorbing element (also not shown).

An interval 8 having a width h is positioned between first light guide arrangement 2 and second light guide arrangement 5. Interval 8 is filled with a foam 9. Therefore, first light guide arrangement 2 and second light guide arrangement 5 are positioned in a Plane which is positioned parallel to an expected impact direction.

Figure 2:
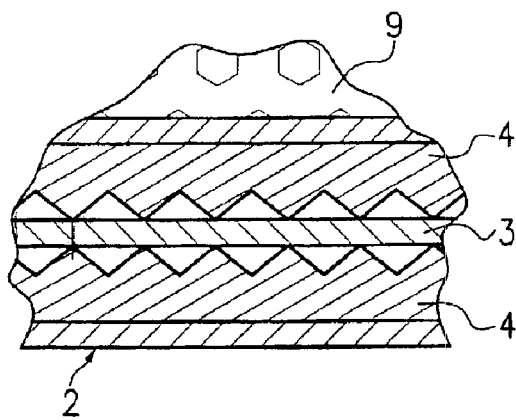
FIG. 2 shows an enlarged sectional view of the light guide illustrated in FIG. 1.

FIG. 2 shows an enlarged detail of first light guide arrangement 2. As shown in FIG. 2, coating 4 includes a serrated interior, whose tips are directly in contact with glass fiber cable 3. The provision of the serrated inner profile of coating 4 ensures that glass fiber cable 3 immediately becomes wavy in the event of compression of coating 4 and the light in light-guiding glass fiber 3 is scattered into the surroundings. In this manner, a rapid and precise recognition of the compression, and therefore of an impact, is possible.

Figure 3:
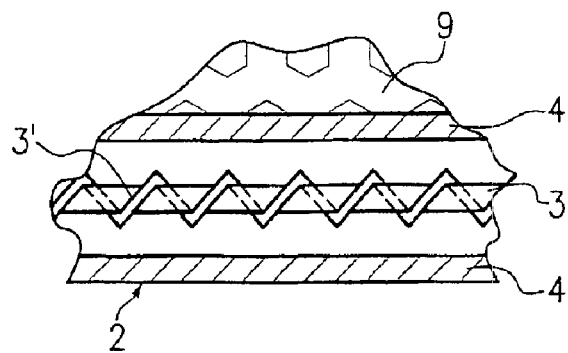
FIG. 3 shows an enlarged sectional view of an example embodiment of a light guide.

Another example embodiment of light guide arrangement 2 is illustrated in FIG. 3. In this case, light-guiding glass fiber 3 is wrapped using an additional glass fiber 3', which has a significantly smaller diameter than light-guiding glass fiber 3. The diameter of glass fiber 3' is, for example, between one half and one third of the diameter of light-guiding glass fiber 3. Both glass fibers 3 and 3' are in turn enclosed by a coating 4 made of plastic, for example. If compression of coating 4 occurs, the same effect results as in the light guide arrangement illustrated in FIG. 2. Therefore, a rapid and precise detection of an impact is also possible using a light guide arrangement as shown in FIG. 3. Of course, second light guide arrangement 5 may also be implemented as shown in FIGS. 2 and 3.

Figure 4:
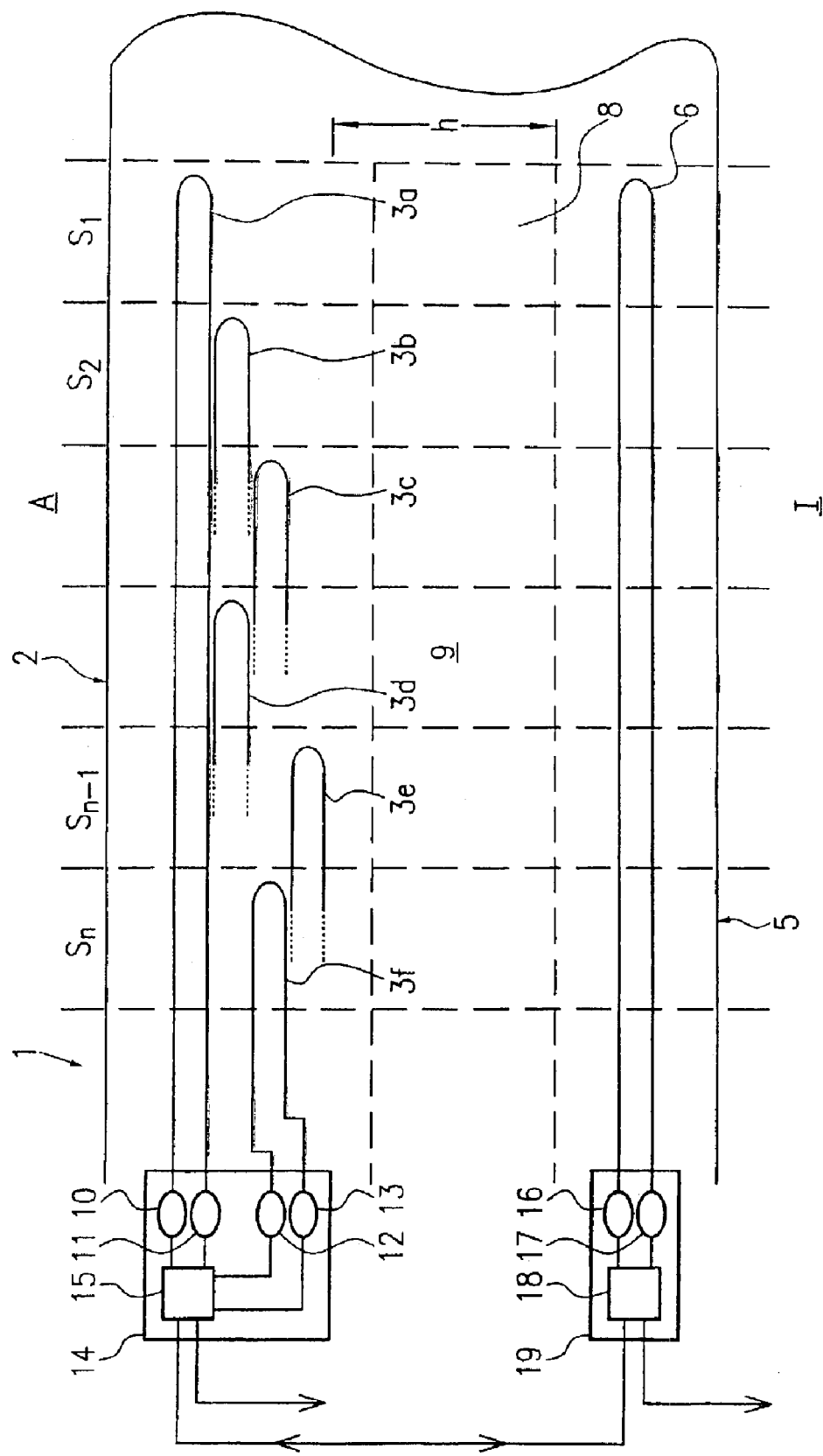
FIG. 4 shows an enlarged sectional view of the intrusion sensor according to the present invention.

The construction of an intrusion sensor according to the present invention is illustrated more precisely in FIG. 4 according to an example embodiment of the present invention. First light guide arrangement 2 includes multiple light guides 3a to 3f, which are laid in loops. In this case, light is fed from LEDs into light guides 3a to 3f. After the light has passed through the light guides, photodiodes absorb the remaining light intensity.

In FIG. 4, this construction is illustrated more precisely for the two light guides 3a and 3f only. An LED 10 feeds light into light guide 3a and a photodiode 11 absorbs the light intensity after the light passes through light guide 3a. For light guide 3f, light is fed by an LED 12 into light guide 3f and absorbed by a photodiode 13. In the same manner, LEDs and/or photodiodes are provided for other light guide loops 3b to 3e, which, however, are no longer shown in FIG. 4 for reasons of clarity. LEDs 10, 12 and photodiodes 11, 13 are connected to an analysis unit 15, which is positioned in a control unit 14.

As shown in FIG. 4, intrusion sensor 1 is divided into multiple segments $S_1$ to $S_n$, each one of light guide loops 3a to 3f extending up to a corresponding segment. Segments $S_1$ to $S_n$ are at identical distances to one another and therefore the lengths of light guide loops 3a to 3f each differ by the length of one segment. In other words, an end loop of the light guide loops is guided through each segment.

As shown in FIG. 4, second light guide arrangement 5 includes only one light guide loop 6, as well as an LED 16 and a photodiode 17. LED 16 and photodiode 17 are connected to an analysis unit 18 and are each positioned in a control unit 19. Analysis unit 18 is connected to analysis unit 15 for first light guide arrangement 2 and both analysis units 15 and 18 are connected to a central processing unit (not shown). An interval 8, which is filled with foam 9, is positioned between first light guide arrangement 2 and second light guide arrangement 5.

In the following, the mode of operation of the intrusion sensor is described. Intrusion sensor 1 for detecting the severity of an accident in a vehicle is positioned in such a manner that first light guide arrangement 2 is positioned on an exterior A of the vehicle and second light guide arrangement 5 is directed toward interior I of the vehicle. In this case, first light guide arrangement 2 and second light guide arrangement 5 form, together with interval 8, a plane which is aligned in the direction of the impact to be expected. If an accident now occurs and an object penetrates into intrusion sensor 1 in, for example, segment $S_{n-1}$, light guide loops 3a to 3e are compressed by the penetration of the object. Due to this, the light intensity absorbed by the photodiodes assigned to the particular light guides changes, so that analysis unit 15 may determine precisely which light guide loops have been bent (micro-bending) and/or damaged. In the present example, light guide loop 3f positioned in segment $S_n$ remains undamaged and/or unbent, so that the light intensity does not change here. Therefore, the intrusion sensor according to the present invention may immediately establish that an intrusion has occurred. Furthermore, the location of the intrusion sensor at which the intrusion occurred may be established immediately. If the object now penetrates deeper into the vehicle as the accident progresses, and therefore also penetrates deeper into the sensor, the object penetrates through interval 8, which is filled with foam, and encounters second light guide arrangement 5.

As shown in FIG. 4, only one light guide loop 6 is provided in light guide arrangement 5. Similarly to first light guide arrangement 2, the object penetrates into second light guide arrangement 5 and therefore changes the light intensity on photodiode 17. Therefore, analogously to first light guide arrangement 2, the fact and the point in time of the incidence of the object on second light guide arrangement 5 may be established. The intrusion speed in a specific segment of the sector may be calculated from the time between the impact of the object on first light guide arrangement 2 and the impact of the object on second light guide arrangement 5, together with width h of interval 8. The location and the severity of the accident may be reliably determined in this manner and restraint arrangement may accordingly be triggered to protect the vehicle occupants.

If, instead of the single light guide loop 6 shown in FIG. 4, multiple light guide loops of different lengths are used in second light guide arrangement 5, analogously to first light guide arrangement 2, the direction in which the object penetrates into the vehicle may additionally be determined. The precision of the direction resolution is a function of the number of segments. For a large number, a good resolution is achieved, while for a small number, only a restricted capability of direction resolution is provided.

In order to have the smallest possible number of components, control units 14 and 19 and analysis units 15 and 18 may be combined into one control unit and one analysis unit, respectively. It is also possible for only one LED and one photodiode to be used for each light guide arrangement, instead of multiple LEDs and photodiodes.

It is therefore possible according to the present invention to trigger the restraint arrangement of the vehicle corresponding to the intensity of the impact and/or the location of the impact. Since both the beginning of the accident and the intrusion speed may be measured rapidly and precisely, the intrusion sensor according to the present invention may allow significantly more rapid deployment times than were previously possible. Therefore, optimal actuation of the restraint systems of the vehicle as a function of location and speed of the impact may be made possible through the central processing unit.

Figure 5:
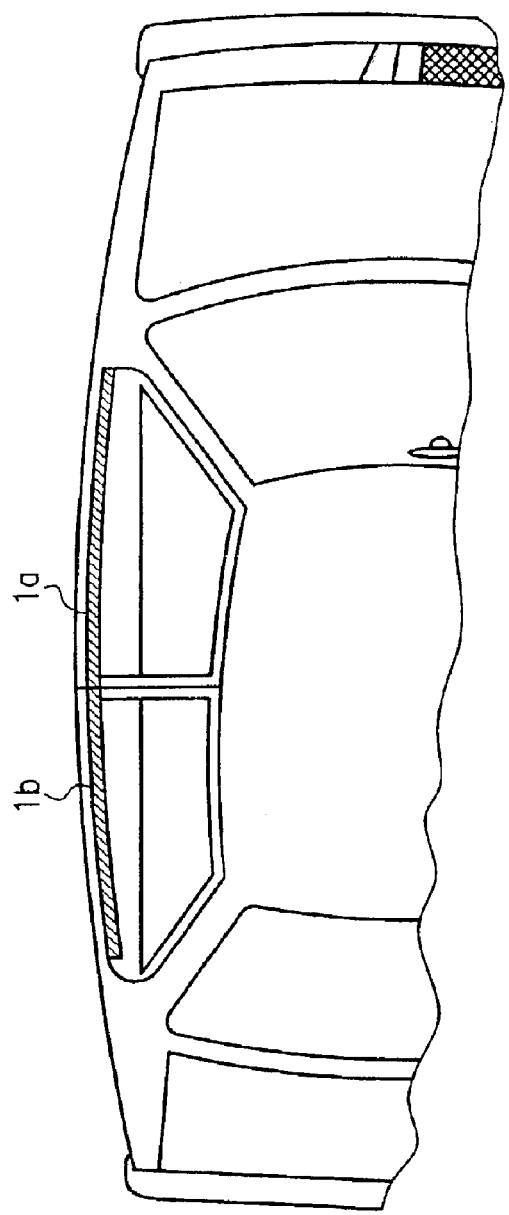
FIG. 5 shows a partial top view of a vehicle including an intrusion sensor according to the present invention.
Figure 6:
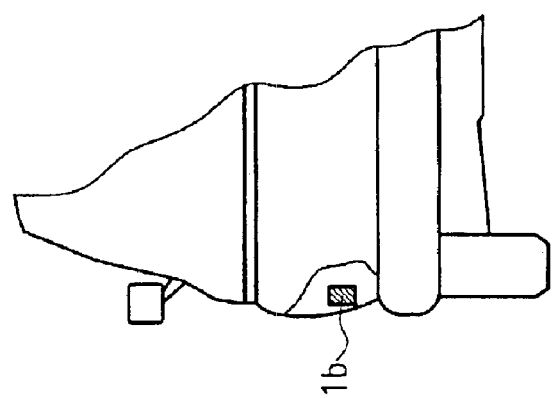
FIG. 6 shows a partially cut-away view from the rear of the vehicle illustrated in FIG. 5.

An example of the positioning of the intrusion sensor according to the present invention in a motor vehicle is illustrated in FIGS. 5 and 6. As shown in FIG. 5, intrusion sensor 1a, 1b may be positioned in the door regions of the vehicle, since the occupants inside the passenger cell are primarily to be protected. In this case, one intrusion sensor 1a is provided for the front door and one intrusion sensor 1b is provided for the rear door. As shown in FIG. 6, the intrusion sensor is positioned in the region of the door which is furthest on the outside, since, in the event of an accident, the first impact contact is highly probably at this point.

In summary, an intrusion sensor for detecting the severity of an accident in a vehicle has been described which includes a first light guide arrangement 2 and a second light guide arrangement 5. An interval 8 having a width h is positioned between both light guide arrangements 2, 5. In this case, first light guide arrangement 2 is positioned in the direction of an intrusion side. Second light guide arrangement 5 is positioned in the direction of the vehicle interior.

The preceding description of the example embodiment according to the present invention is used solely for illustrative purposes and not for the purpose of restricting the present invention. Various changes and modifications are possible in the framework of the present invention without leaving the scope of the present invention and its equivalents.

What is claimed is:

1. An intrusion sensor for detecting a severity of an accident in a vehicle, comprising:
   a first light guide arrangement; and
   a second light guide arrangement, an interval, having a width, being arranged between the first light guide arrangement and the second light guide arrangement;
   wherein the first light guide arrangement is arranged on an intrusion side of the vehicle and the second light guide arrangement is arranged on a vehicle interior side; and
   wherein the first light guide arrangement includes a plurality of light guide loops, lengths of each of the plurality of light guide loops being different.

2. The intrusion sensor according to claim 1, wherein the lengths of the plurality of light guide loops in a longitudinal direction each differ by an identical amount.

3. The intrusion sensor according to claim 1, wherein the interval is filled with a foam.

4. The intrusion sensor according to claim 1, wherein the first light guide arrangement and the second light guide arrangement include a shared light-emitting element.

5. The intrusion sensor according to claim 4, wherein the shared light-emitting element is an LED.

6. The intrusion sensor according to claim 1, wherein the shared light-absorbing element is a diode.

7. The intrusion sensor according to claim 1, wherein the first light guide arrangement and the second light guide arrangement include a shared light-absorbing element.

8. The intrusion sensor according to claim 1, wherein the first light guide arrangement and the second light guide arrangement are configured as self-calibrating.

9. The intrusion sensor according to claim 1, wherein the first light guide arrangement and the second light guide arrangement include a coating.

10. The intrusion sensor according to claim 1, wherein the first light guide arrangement and the second light guide arrangement include a shared analysis unit.

11. The intrusion sensor according to claim 1, wherein the interval is filled with a foam, and the first light guide arrangement and the second light guide arrangement include a shared light-emitting element.

12. The intrusion sensor according to claim 11, wherein the first light guide arrangement and the second light guide arrangement are configured as self-calibrating.

13. The intrusion sensor according to claim 11, wherein the first light guide arrangement and the second light guide arrangement include a coating.

14. The intrusion sensor according to claim 11, wherein the shared light-emitting element is an LED.

15. The intrusion sensor according to claim 11, wherein the first light guide arrangement and the second light guide arrangement include a shared analysis unit.

16. The intrusion sensor according to claim 1, wherein the interval is filled with a foam, and the first light guide arrangement and the second light guide arrangement include a shared light-absorbing element.

17. The intrusion sensor according to claim 16, wherein the first light guide arrangement and the second light guide arrangement are configured as self-calibrating.

18. The intrusion sensor according to claim 16, wherein the first light guide arrangement and the second light guide arrangement include a coating.

19. The intrusion sensor according to claim 16, wherein the shared light-absorbing element is a diode.

20. The intrusion sensor according to claim 16, wherein the first light guide arrangement and the second light guide arrangement include a shared analysis unit.

21. An intrusion sensor for detecting a severity of an accident in a vehicle, comprising:
    a first light guide arrangement; and
    a second light guide arrangement, an interval, having a width, being arranged between the first light guide arrangement and the second light guide arrangement;
    wherein the first light guide arrangement is arranged on an intrusion side of the vehicle and the second light guide arrangement is arranged on a vehicle interior side, and
    wherein the first light guide arrangement and the second light guide arrangement are configured as self-calibrating.

* * * * *

UNITED STATES PATENT AND TRADEMARK OFFICE
CERTIFICATE OF CORRECTION

PATENT NO. : 6,960,992 B2
DATED : November 1, 2005
INVENTOR(S) : Moritz et al.

It is certified that error appears in the above-identified patent and that said Letters Patent is hereby corrected as shown below:

Column 3,
Line 42, change "positioned in a Plane" to -- positioned in a plane --.

Column 6,
Line 11, change "according to claim 1," to -- according to claim 7, --.

Signed and Sealed this

Thirty-first Day of January, 2006

JON W. DUDAS
*Director of the United States Patent and Trademark Office*